Aug. 2, 1932.  F. N. BARD  1,869,363
REVERSE GEAR MECHANISM
Filed Nov. 6, 1926   3 Sheets-Sheet 3
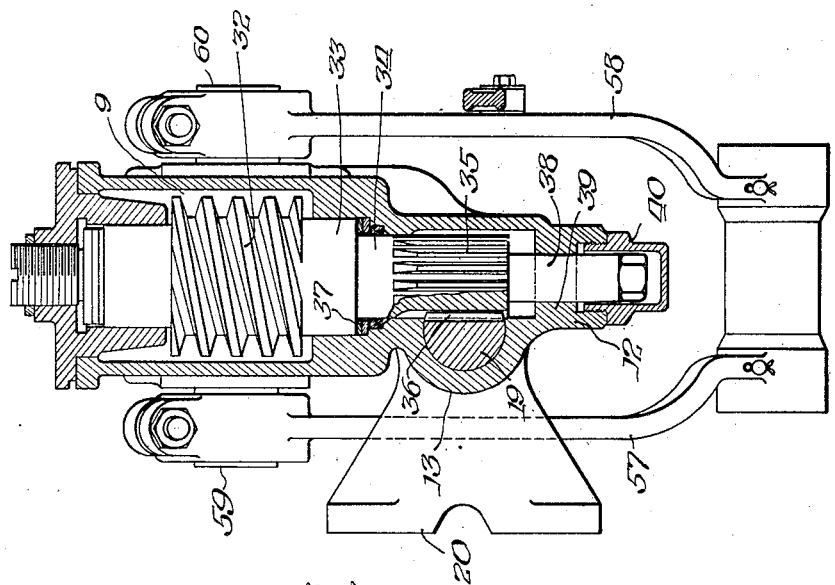
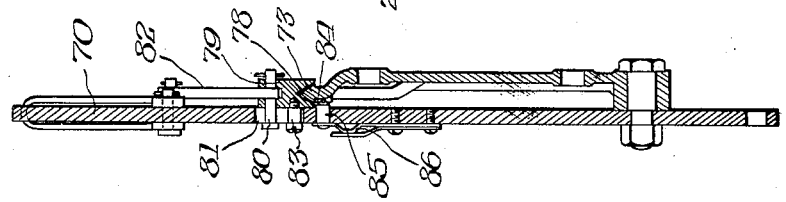
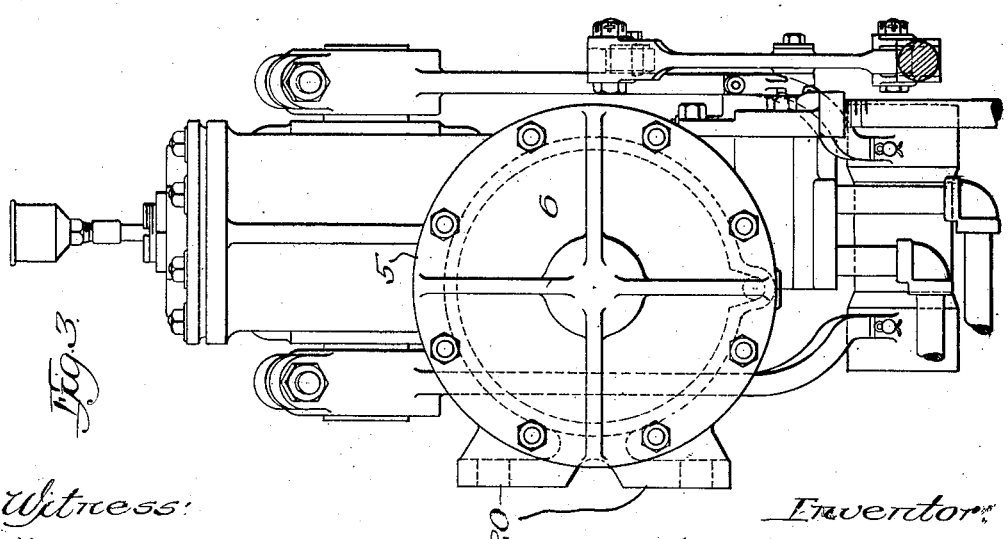

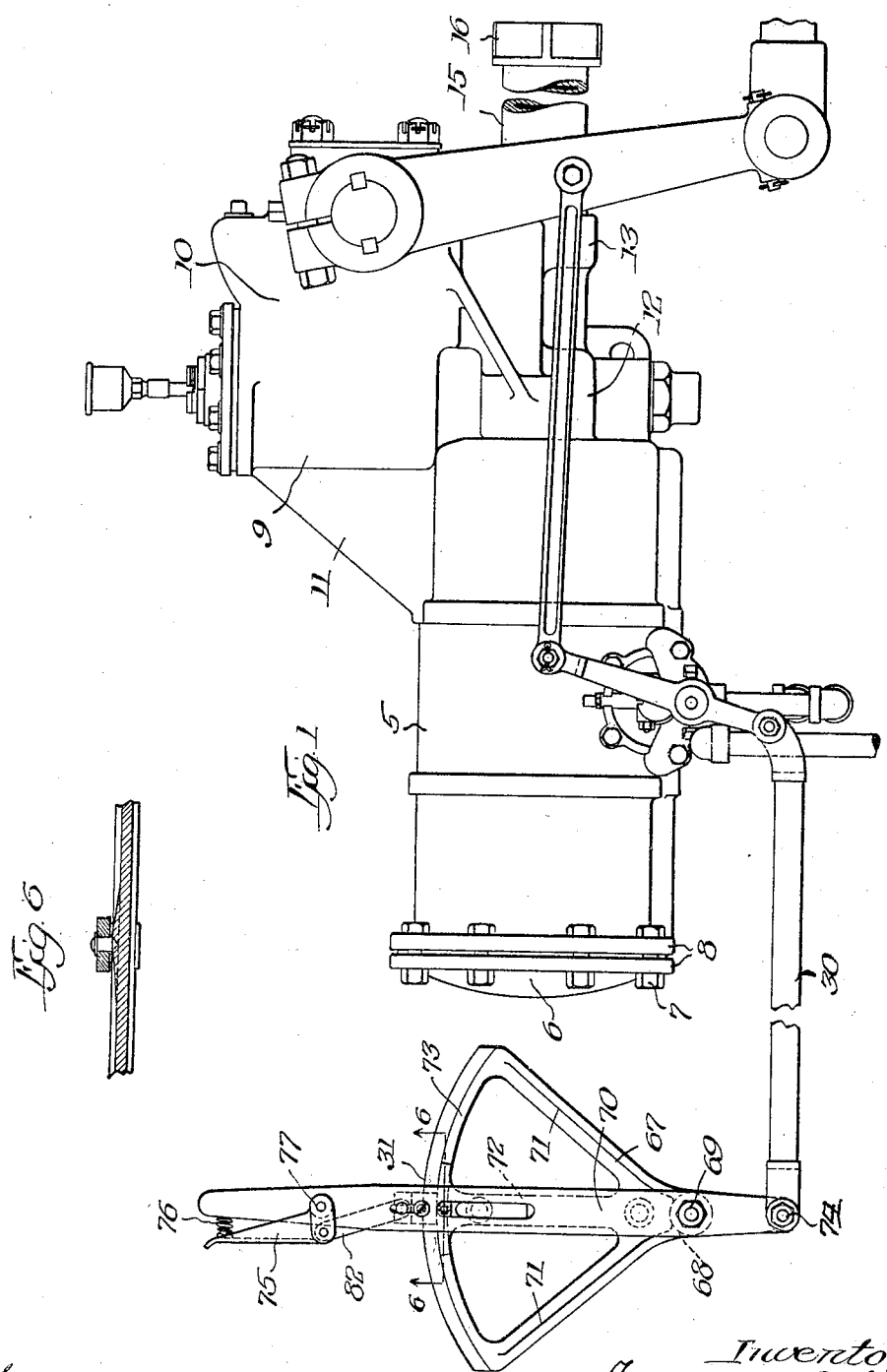

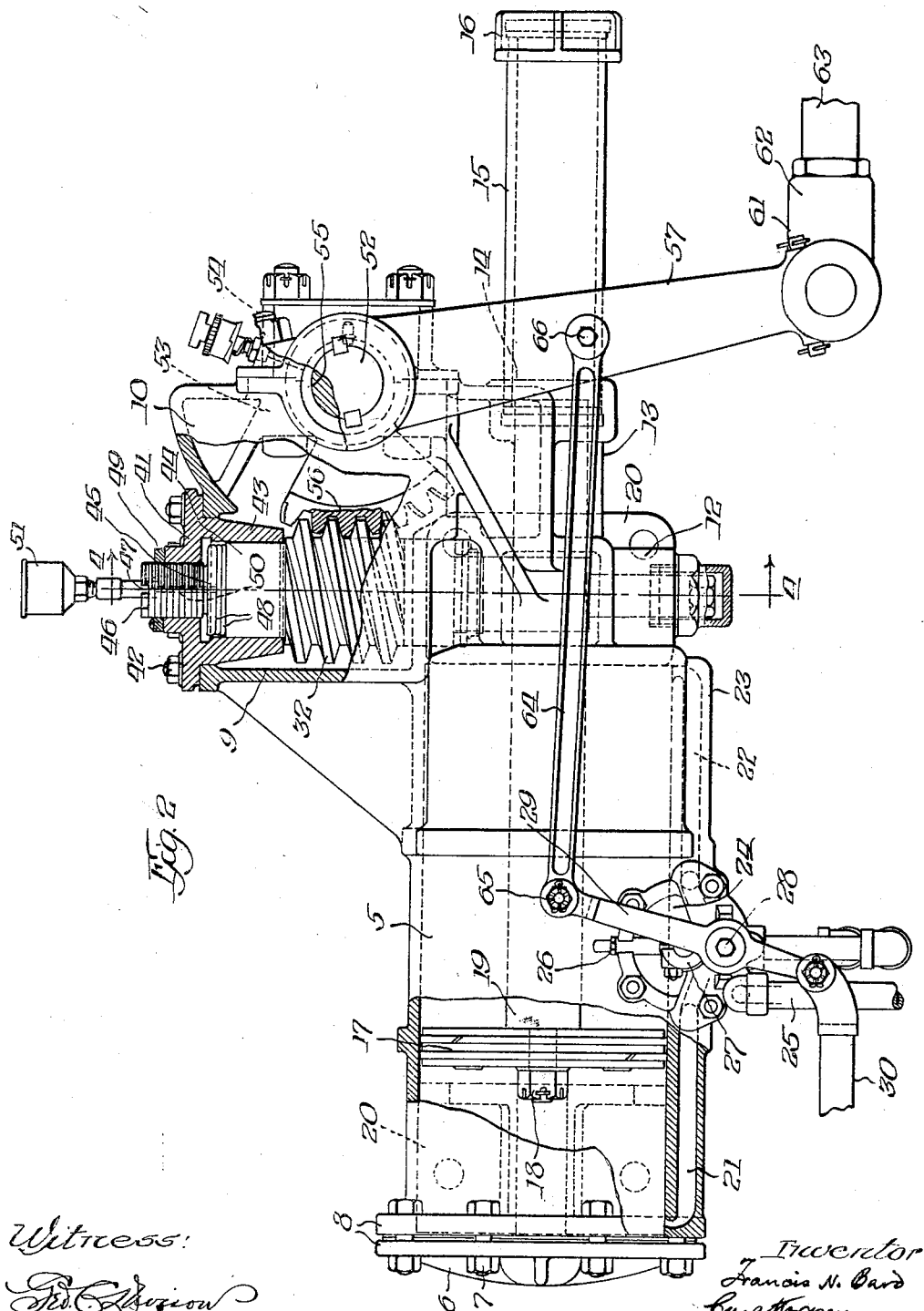

Patented Aug. 2, 1932

1,869,363

UNITED STATES PATENT OFFICE

FRANCIS NORWOOD BARD, OF HIGHLAND PARK, ILLINOIS

REVERSE GEAR MECHANISM

Application filed November 6, 1926. Serial No. 146,692.

This invention relates broadly to fluid pressure operated devices, and more particularly pertains to an improved fluid pressure operated motor for transmitting motion, and especially adapted for use in reversing or otherwise changing the positions of steam engine valves, such as employed in locomotive practice.

While, for the sake of convenience, this invention is illustrated and described as a valve controlling device for steam locomotives, it will be readily understood that the invention is not limited to the specific adaptation herein set forth, but finds a wide field of utility for other purposes.

The principal objects and advantages which characterize this invention reside in: The provision of improved means for transmitting motion in one of two opposite directions through prescribed limits under the application of fluid pressure; the provision of improved means for imparting and controlling motion under the application of manual and fluid pressures; the provision of improved means for imparting rectilinear motion through the application of fluid pressure; the provision of improved motion transmitting means; the provision of improved motion transmitting means characterized by the embodiment therewith of improved motion translating means; the provision of an improved fluid operated motion transmitting device; the provision of an improved fluid operated motion transmitting device characterized by the provision of improved motion translating means and adjusting means therefor.

This invention is further characterized by the provision of an improved reverse gear operating unit including improved motion translating mechanism and means for adjusting the relationship of the parts thereof; the provision of an improved reversing gear operating unit including an improved construction of the bearings of moving parts thereof; the provision of an improved reverse gear operating unit including a cylinder, a piston movable therein, a rocker arm actuated thereby and improved adjusting means for said rocker arm; the provision of an improved reverse gear operating unit including an improved lubricating method and means; the provision of a fluid pressure operated device including an improved arrangement of controlling valve mechanism; the provision of an improved reverse gear operating unit including an improved construction of motion transmitting element and thrust bearing therefor; and the provision of an improved reverse gear operating unit including all of the advantages above set forth and formed as a structure which may be bodily installed in a desirable location for connection to the reverse gear mechanism, together with such other objects and advantages as may hereinafter appear.

This invention is still further characterized by the provision of an improved construction of manually operating means wherein minute degrees of adjustment may be attained and held for setting the reverse gear operating mechanism in a position to attain the most desirable results.

The foregoing and such other objects and advantages such as will appear or may be pointed out as this description proceeds are attained in the structural embodiment illustrated in the accompanying drawings in which:

Figure 1 is a side elevational view of the device of this invention and the manually controlled means thereof, Figure 2 is an enlarged elevational view partly shown in a section of the device of this invention, Figure 3 is an end elevational view of the device of this invention as seen from the aspect of the left hand end of Figure 2, Figure 4 is a vertical sectional view taken on the line 4—4 of Figure 2 looking in the direction indicated by the arrows, Figure 5 is a vertical sectional view of the manually operating means, and Figure 6 is a fragmentary sectional view taken on the line 6—6 of Figure 1 looking in the direction indicated by the arrows.

Referring now more particularly to the drawings and first in general to Figure 1, there is provided a cylinder 5 having, at one end, a removable head 6, said head being fixedly retained on the cylinder by the provision of bolts 7, or the like, fastened through flanges 8 formed on the cylinder and on said head.

At or near the opposite end of the cylinder, there is provided, preferably integrally with the cylinder, a piston housing 9 provided with a laterally extending portion 10 forming a suitable bearing or bearings, as will hereinafter be pointed out.

The housing 9 is connected to the cylinder 5 by a vertical web 11 which serves to reinforce the entire structure at this point. The housing 9 forms an enclosure for a movable element of the device to be hereinafter described, and also serves to support bearings for this element, the lower end of the housing being reduced in size, as at 12, for a purpose which will presently appear.

The cylinder 5 is provided with an axial extension 13, preferably integral therewith and with said housing 9 and serving to accommodate moving parts of the device as will be pointed out. The axial extension 13 is provided with an internally threaded opening shown in dotted lines at 14 in Figure 2 for accommodating an auxiliary removable casing or housing 15, closed by a cap member 16, said housing being cylindrical and readily screwed into the opening 14.

The cylinder 5 is provided with a piston 17, slidable therein and connected by a retaining nut 18 to the reduced end of a piston rod 19, said piston rod, as above shown in Figure 4, being substantially semi-cylindrical and extending through the axial opening 14 into the auxiliary housing 15 in certain positions, as will hereinafter appear.

The cylinder 5 and the housing 9 and portion 13 form a single casting, and foot portions 20, 20 are provided thereon for facilitating securement rigidly of the casting to an available part of a locomotive between the valve gear mechanism and the cab, whereby the motion of the piston may be imparted to the valve gear mechanism.

Fluid under pressure is admitted and exhausted from the cylinder by the provision of passageways 21 and 22 formed in an enlarged portion 23 of the peripheral wall of the cylinder, preferably in a position beneath said cylinder when in normal position on a locomotive, and fluid under pressure is admitted to said passageways and exhausted therefrom by the provision of a valve 24 demountably secured in part to the cylinder and controlling the communication from a suitable fluid supply pipe 25 to said passageways 21 and 22. The valve is not shown in detail because the general structure thereof is subject to variation but a desirable form of the valve is described and claimed in the application of Bertram, Serial No. 600,659.

In general, the valve includes a disc (not shown) within the casing shown at 24 and having a valve stem or shaft 26 on which is secured an operating lever 27, which latter is connected at 28 to a toggle lever 29, said lever 29 being oscillatable about the connection 28, the latter thereby forming a fulcrum for the lever 29, as will hereinafter appear.

The lower end of the lever 29 is connected by a short reach rod 30 to manual operating means, generally indicated at 31 in Figure 1, located in the cab of the locomotive or at any other convenient point. The manual means will be described hereinafter.

The valve gear operating unit further includes, with the piston 17, a piston rod 19 and vertically disposed motion transmitting elements including a worm 32, formed integrally with a shaft 33, the latter being reduced in diameter, as at 34, and formed to provide a pinion 35 which meshes with gear teeth 36 formed on the flat side of the piston rod 19. The piston rod cannot rotate in the opening 14 or in the auxiliary housing 15 for the reason that the flat surface of said piston rod, being engaged with the pinion 35, is prevented against such rotation. However, the piston rod is free to slide in response to fluid pressure imposed upon the piston 17 and thereby impart rotation to the pinion 35, and worm 32.

It will be observed that the worm 32, disposed in the upper enlarged portion of the housing 9, is provided with a packed thrust bearing 37 below the portion 33, which serves also for the retention of a lubricant, the motion transmitting element including said worm and pinion being further extended in length, as at 38, to form a shaft which engages a bearing 39 in the bottom end of the reduced portion 12 of the housing 9 to prevent tortional strains or vibration of the worm or pinion in operation. A suitable cap 40 is threaded into the open end of the part 12 to prevent the ingress of dust and foreign matter to the housing, and for retaining a lubricant. Obviously, while the worm and pinion are integrally formed, this construction is not indispensable.

The upper end of the housing 9 is provided with a closure 41 secured thereon by the provision of bolts and nuts 42 and having an outwardly extending flange and cylindrical reduced portion 44 above the worm so that vibration of the worm at this point is adequately prevented. In order to prevent chattering of the worm, that is, reciprocation thereof in operation, I provide a thrust bearing carried by the cap or closure member 41. This thrust bearing includes the cap member which may be of cast iron and a thrust bearing plate 45, preferably of forged steel provided with a threaded extension 46 threaded into the cap 41 and provided with a cross groove 47 whereby its adjustment may be conveniently attained from outside the housing.

Beneath the thrust plate 45 I provide steel and bronze thrust plates 48 which engage the flat upper end of the portion 44. The pressure of the thrust plate 45 on the upper end of the worm and the engagement of the portion 33 with the packing 37 permits of free rotative movement of the worm in response to movement of the piston but prevents chattering, the packing being slightly yielding. The thrust plate 45 is locked in position by the provision of a lock washer 49 threaded on to the extension 46.

Lubricant may be conveniently introduced by providing an oil duct 50 through the extension 46 and applying an oil cup 51 to said duct. A spanner wrench may be employed for rotating the extension 46 as desired.

The motion of the worm in either direction is transmitted to a rocker arm and this motion is, in turn, transmitted to the valve gear mechanism and to the control valve, as will hereinafter appear.

The enlarged extending portion 10 of the casing 9 serves, as previously pointed out, to support bearings for a shaft 52 which latter is suitably supported in bearing supported members, one-half of the bearing being formed, as shown at 53, in the enlargement 10, and the other half of said bearing being removable, as indicated at 54. Suitable bushings 55, 55, which form the bearings proper, are mounted in the bearing supports 53 and 54 and are rotatable therein, said bushings being mounted in bores in the bearing members which are eccentric to the axis of the shaft so that rotation of said bushings will cause a lateral displacement of said shaft toward and away from the worm as desired. On the medial portion of the shaft 52 in the housing 10 and in proper alignment with the worm 32 I provide a segmental gear 56 removable with the shaft 52 and meshing with the threads of the worm 32. Rotation of the worm causes rotation of the shaft 52 by angular displacement of the segmental gear 56 within predetermined limits.

In order to impart motion from the shaft 52 and to prevent lateral twisting or other undue strain on said shaft, I provide rocker arms 57 and 58 fixedly secured, as at 59, 60, to opposite ends of the shaft 52 outside the casing and extending downwardly on either side of the auxiliary housing 15 sufficiently spaced apart so as not to come in contact with any of the stationary parts of the device, said rocker arms being jointly connected, as at 61, to the adjacent end 62 of the long reach rod 63. The long reach rod 63 extends to the tumbling shaft of a standard Walschaert valve gear or other steam engine reversing gear.

It will be obvious that the motion of the piston in either direction is imparted to the worm to cause rotation thereof and hence oscillation or angular displacement of the segmental gear 56 and rocker arms 57, and thereby the reciprocation of the long reach rod 63 for reversing the engine or for regulating the cut off. Any tendency for the engine reverse gear mechanism to change its setting is arrested by virtue of the inability of the segmental gear to move the worm, the worm thus forming a lock for the valve gear mechanism for retaining in a desired position of cut off.

By the provision of the thrust bearings, it is obvious that the worm is not only prevented from chattering, that is, reciprocating in its bearings, but that by adjustment of the bushings forming the bearings for the shaft 52, lost motion of the worm and between the segmental gear 56 and the worm, owing to wear or for any other reason, may be prevented and thus a slipping of the valves of the engine due to lost motion between the reverse gear mechanism and the operating unit is substantially entirely eliminated.

The device of this invention must, as will be readily appreciated, be provided with some method for preventing movement of the piston beyond a predetermined point desired by the engineman. This is accomplished by connecting the control valve not only to the manual operating means but as well to the rocker arms 57, so that said arms in their movement tend to close the valve or bring it to lap position after a predetermined movement of the piston has taken place corresponding to the degree of displacement of the valve by manual means. In other words, when the manual means is moved to open the valve, the valve gear operating unit automatically moves to a predetermined point, at the same time gradually closing the valve or bringing it to lap position, whereupon movement of the valve gear operating unit ceases.

This is accomplished by connecting the upper end of the toggle lever 29 to the rocker arm 57 by means of a link 64 pivotally connected at 65 to the toggle lever 29 and at 66 to rocker arm 57.

The manual operating means of the present invention may be of any desired form which will cause reciprocation of the short reach rod 30 and hence displacement of the toggle lever 29 about the joint 65 as a fulcrum for moving the valve in its housing, but, in the present instance, I prefer to employ the manual operating means above shown in Figures 1 to 5, and 6.

The manual operating means preferred by me in the present instance includes a frame 67 which may be rigidly secured to a convenient part of the locomotive, preferably near the engineer's position, on the boiler head in the cab. This frame includes the fulcrum portion 68 having a fulcrum bolt 69 on which the reverse lever 70 is pivoted, and the frame also includes the radial arms 71, 71 and the intermediate arm 72, all connected as a single casting and supporting as an integral part thereof the arcuate lock bar 73.

The lower end of the reverse lever 70 is connected, as at 74, to the short reach rod 30, and the upper end of the lever 70 is provided with a friction lock mechanism including, a hand grip member 75, spring 76 actuating same outwardly, and pivoted, as at 77, to the reverse lever. The lock bar 73 is provided with diverging upper faces forming a substantially V-shaped surface 78 and a friction block 79 provided with a complemental face is adapted to slide vertically on the reverse lever and engage said lock bar. The friction block 79 is provided with a pin 80 forming a guide which passes through the slot 81 in the reverse lever 70 and also serves to connect a link 82 to the friction block and to the hand grip 75. The block is prevented against rotation by the provision of a cap screw 83 also sliding in said slot 81. The spring 76 tends to force the friction block 79 on to the lock bar 73, thereby retaining the reverse lever in various positions, as determined by the engineman.

The absence of teeth on the lock bar permits of fine adjustment of the control valve and hence fine adjustment of the reverse gear mechanism and the cut off. In order that the engineman may accurately determine the neutral point, the lock bar is provided with a recess 84 facing the reverse lever, and the latter carries a detent 85 spring pressed by means of the flat spring 86 to engage in the recess 84 when in the neutral position.

Having thus described my invention and illustrated its use, what I claim as new and desire to secure by Letters Patent is:

1. In a reverse gear operating mechanism, a cylinder, a piston movable therein, a piston rod actuated by said piston and provided with gear teeth, a worm and a pinion in axial alinement, said pinion engaging said teeth, an oscillating lever provided with a worm gear operatively engaging said worm, and means for laterally adjusting the fulcrum of said lever.

2. In a reverse gear operating mechanism, a cylinder, a piston movable therein, a piston rod actuated by said piston and provided with gear teeth, a worm and a pinion in axial alinement, said pinion engaging said teeth, thrust bearings for said worm, an oscillating lever provided with a worm gear operatively engaging said worm, and means for laterally adjusting the fulcrum of said lever.

3. In a reverse gear operating mechanism, a cylinder, a piston movable therein, a piston rod actuated by said piston and provided with gear teeth, a worm and a pinion in axial alinement, said pinion engaging said teeth, upper and lower bearings for said worm and pinion, one of said bearings being adjustable, an oscillating lever provided with a worm gear operatively engaging said worm, and means for laterally adjusting the fulcrum of said lever.

4. In a reverse gear operating mechanism, a cylinder, a piston movable therein, a piston rod actuated by said piston and provided with gear teeth, a worm and a pinion in axial alinement, said pinion engaging said teeth, upper and lower bearings for said worm and pinion, one of said bearings being an adjustable thrust bearing, an oscillating lever provided with a worm gear operatively engaging said worm, and means for laterally adjusting the fulcrum of said lever.

5. In a reverse gear actuating mechanism, the combination with a cylinder and a piston operable therein, and a rotatable member arranged at an angle to the piston and means connecting said piston and rotatable member, of means for adjusting said rotatable member along its axis including a thrust bearing member having a socket receiving one end of said rotatable member, thrust bearing member in said socket, and a motion translating element connected to the reverse gear and to rotatable element.

6. In a reverse gear actuating mechanism, the combination with a cylinder and a piston operable therein, and a rotatable member arranged at an angle to the piston and means connecting said piston and rotatable member, of means for adjusting said rotatable member along its axis including a thrust bearing member having a socket receiving one end of said rotatable member, thrust bearing member in said socket, an oscillatable element connected to the reverse gear and mounted on an axis transversely of said rotatable element, and means for adjusting the axis of said oscillatable element transversely of the axis of said rotatable element.

7. In a reverse gear actuating mechanism, the combination with a cylinder and a piston operable therein, and a rotatable member arranged at an angle to the piston and means connecting said piston and rotatable member, of means for adjusting said rotatable member along its axis including a thrust bearing member having a socket receiving one end of said rotatable member, thrust bearing member in said socket, an oscillatable element connected to the reverse gear and mounted on an axis transversely of said rotatable element, and means for adjusting the axis of said oscillatable element transversely of the axis of said rotatable element, said last named means including eccentric supporting bushings.

8. In a device of the character described, in combination, a rectilinearly movable piston, a revoluble element to be moved thereby and angularly disposed with respect to the plane of movement of the piston, a worm axially arranged to be driven by said revoluble element, an oscillatable element on an axis at right angles to said worm and having a worm gear engaging the latter, and adjustable bearings for said revoluble element and worm for longitudinally adjusting the latter relatively to said worm gear for taking up lost motion.

9. In a device of the character described, in combination, a rectilinearly movable piston, a revoluble element to be moved thereby and angularly disposed with respect to the plane of movement of the piston, a worm axially arranged to be driven by said revoluble element, an oscillatable element on an axis at right angles to said worm and having a worm gear engaging the latter, adjustable bearings for said revoluble element and worm for longitudinally adjusting the latter relatively to said worm gear for taking up lost motion, bearings for said worm gear and oscillatable element, and means for adjusting the last mentioned bearings to move the worm gear toward and away from said worm.

10. In a reverse gear mechanism, a cylinder, a piston movable therein, a piston rod connected to the piston, a worm and a pinion in axial alinement operated by said piston rod, a rock shaft and a worm gear thereon engaging said worm, in a plane at an angle thereto and to said piston bearings for said worm gear, means for adjusting said bearings laterally to and from said worm, bearings for said worm and pinion, and means for adjusting said last named bearings for longitudinally adjusting said worm and pinion.

In testimony whereof, I have hereunto signed my name.

FRANCIS NORWOOD BARD.